(12) United States Patent
Okada et al.

(10) Patent No.: US 11,823,552 B2
(45) Date of Patent: Nov. 21, 2023

(54) VEHICLE STATE PRESENTATION SYSTEM, VEHICLE, TERMINAL DEVICE, AND VEHICLE STATE PRESENTATION METHOD

(71) Applicant: TOYOTA JIDOSHA KABUSHIKI KAISHA, Toyota (JP)

(72) Inventors: Hiroki Okada, Toyota (JP); Ryuta Atsumi, Toyota (JP); Satoshi Fujisaki, Nagoya (JP); Daisuke Hiroki, Toda (JP); Shinpei Asai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/546,914

(22) Filed: Dec. 9, 2021

(65) Prior Publication Data

US 2022/0101716 A1 Mar. 31, 2022

Related U.S. Application Data

(63) Continuation of application No. 16/896,599, filed on Jun. 9, 2020, which is a continuation of application
(Continued)

(30) Foreign Application Priority Data

Sep. 27, 2017 (JP) ................................ 2017-186795

(51) Int. Cl.
*G08B 21/24* (2006.01)
*B60Q 9/00* (2006.01)
(Continued)

(52) U.S. Cl.
CPC .............. *G08B 21/24* (2013.01); *B60K 35/00* (2013.01); *B60Q 5/005* (2013.01); *B60Q 9/001* (2013.01);
(Continued)

(58) Field of Classification Search
CPC .. G08B 21/24; B60K 35/00; B60K 2370/157; B60K 2370/193; B60K 2370/62;
(Continued)

(56) References Cited

U.S. PATENT DOCUMENTS 6,556,135 B2 4/2003 Attring et al.
6,922,147 B1 7/2005 Viksnins et al.
(Continued)

FOREIGN PATENT DOCUMENTS

CN 101188044 A 5/2008
DE 102016120945 A1 5/2017
(Continued)

OTHER PUBLICATIONS

Claire Swedberg, "Bluetooth Beacons Delivers Alerts to Bus Riders, Drivers", RFID Journal, pp. 1-3, Jan. 4, 2016.
(Continued)

*Primary Examiner* — Eric Blount
(74) *Attorney, Agent, or Firm* — Oliff PLC (57) ABSTRACT

An information processing device includes: an acquisition unit that acquires information indicating a state of a vehicle from the vehicle; and a notification unit that performs a first notification regarding the state when the information processing device is outside a predetermined range including the vehicle, and that performs a second notification including more information on the state than the first notification when the information processing device is in the predetermined range.

17 Claims, 5 Drawing Sheets

VEHICLE STATE PRESENTATION SYSTEM 11

Related U.S. Application Data

No. 16/132,763, filed on Sep. 17, 2018, now Pat. No. 10,769,928.

(51) Int. Cl.
   *B60R 25/10* (2013.01)
   *B60Q 5/00* (2006.01)
   *B60K 35/00* (2006.01)
   *B60R 16/023* (2006.01)

(52) U.S. Cl.
   CPC ........ *B60R 16/023* (2013.01); *B60R 25/1001* (2013.01); *B60K 2370/157* (2019.05); *B60K 2370/193* (2019.05); *B60K 2370/62* (2019.05); *B60K 2370/794* (2019.05); *B60R 2025/1016* (2013.01)

(58) Field of Classification Search
   CPC .. B60K 2370/794; B60Q 5/005; B60Q 9/001; B60R 16/023; B60R 25/1001; B60R 2025/1016; G08C 17/02; H04W 4/021; H04W 12/06
   USPC .......................................................... 340/691.3
   See application file for complete search history.

(56) References Cited

U.S. PATENT DOCUMENTS

| | | |
|---|---|---|
| 7,167,083 B2 | 1/2007 | Giles |
| 7,579,944 B2 | 8/2009 | Ikeda |
| 8,368,522 B1 | 2/2013 | Kralj |
| 8,493,177 B2 | 7/2013 | Flaherty et al. |
| 8,629,767 B2 * | 1/2014 | Stefanovski ............ B60R 25/24 340/425.5 |
| 9,327,645 B2 * | 5/2016 | Raman .................. G08B 21/24 |
| 9,440,618 B2 | 9/2016 | Patel |
| 9,522,651 B2 | 12/2016 | Tominaga |
| 9,666,040 B2 | 5/2017 | Flaherty et al. |
| 9,744,905 B1 | 8/2017 | Assam |
| 10,104,460 B2 | 10/2018 | Boesen |
| 10,112,535 B1 | 10/2018 | Assam |
| 2005/0099275 A1 | 5/2005 | Kamdar et al. |
| 2005/0184862 A1 | 8/2005 | Nagata |
| 2005/0283286 A1 | 12/2005 | Kanda et al. |
| 2006/0149431 A1 * | 7/2006 | Wilson .................. B60R 25/257 701/2 |
| 2006/0220834 A1 | 10/2006 | Maeng |
| 2006/0255911 A1 | 11/2006 | Taki et al. |
| 2008/0231433 A1 | 9/2008 | McBride et al. |
| 2010/0141412 A1 | 6/2010 | Partin et al. |
| 2010/0201481 A1 | 8/2010 | Au et al. |
| 2015/0161834 A1 | 6/2015 | Spahl et al. |
| 2015/0243156 A1 * | 8/2015 | Itoh ........................ H04W 4/00 340/539.11 |
| 2016/0059777 A1 | 3/2016 | Malone et al. |
| 2016/0061613 A1 | 3/2016 | Jung et al. |
| 2016/0107611 A1 | 4/2016 | Siswick et al. |
| 2016/0200250 A1 | 7/2016 | Westmoreland |
| 2016/0212522 A1 | 7/2016 | Lee et al. |
| 2016/0335817 A1 | 11/2016 | Hatton |
| 2017/0123503 A1 | 5/2017 | Szczerba et al. |
| 2017/0249789 A1 | 8/2017 | Mizuno et al. |
| 2017/0344826 A1 | 11/2017 | Kanematsu |
| 2018/0257668 A1 | 9/2018 | Tonshal et al. |
| 2018/0272965 A1 | 9/2018 | Chen et al. |
| 2018/0272991 A1 | 9/2018 | Tayama |
| 2018/0286150 A1 | 10/2018 | Chen et al. |
| 2019/0007767 A1 | 1/2019 | Boesen |
| 2019/0161057 A1 | 5/2019 | Alderman et al. |
| 2019/0312965 A1 | 10/2019 | Park et al. |

FOREIGN PATENT DOCUMENTS

| | | |
|---|---|---|
| JP | 2001-164807 A | 6/2001 |
| JP | 2002-165778 A | 6/2002 |
| JP | 2004-019381 A | 1/2004 |
| JP | 2005-344335 A | 12/2005 |
| JP | 2010-086328 A | 4/2010 |
| JP | 2010-138623 A | 6/2010 |
| JP | 2010-205063 A | 9/2010 |
| JP | 2013-063672 A | 4/2013 |
| JP | 2017-043267 A | 3/2017 |
| TW | 201511578 A | 3/2015 |
| WO | 2015/020889 A1 | 2/2015 |
| WO | 2017/074309 A1 | 5/2017 |
| WO | 2017/078680 A1 | 5/2017 |
| WO | 2017/089533 A1 | 6/2017 |

OTHER PUBLICATIONS

Partial Translation of Jul. 22, 2021 Office Action issued in Chinese Patent Application No. 201811134017.0.
Sep. 27, 2019 Office Action issued in U.S. Appl. No. 16/132,763.
Mar. 6, 2020 Notice of Allowance issued in U.S. Appl. No. 16/132,763.
Nov. 10, 2020 Office Action issued in U.S. Appl. No. 16/896,599.
Mar. 3, 2021 Office Action issued in U.S. Appl. No. 16/896,599.
Jun. 9, 2021 Office Action issued in U.S. Appl. No. 16/896,599.
Sep. 27, 2021 Notice of Allowance issued in U.S. Appl. No. 16/896,599.
Dec. 8, 2022 Office Action issued in U.S. Appl. No. 17/544,308.
Qilin Zhang et al. "Culture Knowledge of the Elderly", p. 801. Liaoning University Press. Published Oct. 1989.
Mar. 30, 2023 Office Action issued in U.S. Appl. No. 17/544,308.
Jun. 29, 2023 Notice of Allowance issued in U.S. Appl. No. 17/544,308.

* cited by examiner

VEHICLE STATE PRESENTATION SYSTEM, VEHICLE, TERMINAL DEVICE, AND VEHICLE STATE PRESENTATION METHOD

This is a Continuation of U.S. patent application Ser. No. 16/896,599 filed Jun. 9, 2020 (now U.S. Pat. No. 11,238,720), which in turn is a Continuation of U.S. patent application Ser. No. 16/132,763 filed Sep. 17, 2018 (now U.S. Pat. No. 10,769,928), which claims the benefit of Japanese Patent Application No. 2017-186795 filed in Japan on Sep. 27, 2017. The disclosure of each of the prior applications is hereby incorporated by reference herein in its entirety.

BACKGROUND

1. Technical Field

The present disclosure relates to a vehicle state presentation system that communicates with a vehicle and performs a notification indicating a state of the vehicle, a vehicle, a terminal device, and a vehicle state presentation method.

2. Description of Related Art

A technique for notifying a user of a predetermined state of a vehicle has been proposed. For example, outputting a sound from a speaker provided in a vehicle or performing call transmission or mail transmission to a mobile terminal of the user to perform a notification when the user leaves the vehicle by a predetermined distance or a predetermined time has elapsed in a state in which a door is not locked has been proposed (See Japanese Unexamined Patent Application Publication No. 2005-344335 (JP 2005-344335A) and Japanese Unexamined Patent Application Publication No. 2010-205063 (JP 2010-205063 A)). Accordingly, the user can notice that the user has forgotten to lock the door and can return to the vehicle to take action, such as a door locking manipulation.

SUMMARY

When a user gets off the vehicle in a state in which a door of the vehicle is not locked or a lamp is lit, and leaves the state as described above, a third party is likely to ride the vehicle or the amount of charging of a battery is likely to decrease, which is not desirable. When the user leaves the vehicle, it is desirable that, for example, all lamps are turned off, all of windows are closed, and all of doors are closed and locked in a state in which an engine is stopped and an ignition switch is turned off. When a notification indicating that a state of the vehicle is not the state as described above is performed through a sound from a speaker provided in the vehicle or when the notification is performed visually on a lamp, a display, or the like, the notification is also perceived by a third party, and there is room for improvement in terms of security. When the notification is performed by performing call transmission or mail transmission to the mobile terminal of the user, the user is likely not to notice the notification.

The present disclosure provides a vehicle state presentation system, a vehicle, a terminal device, and a vehicle state presentation method capable of notifying solely a user that a state of the vehicle is not a predetermined state when the user leaves the vehicle, in such a manner that solely the user easily notices the fact.

A first aspect of the present disclosure relates to a vehicle state presentation system including a terminal device and a vehicle. The terminal device includes an ear mounting unit that is mounted on an ear of a user. The vehicle performs wireless communication with the terminal device. The vehicle includes a first communication unit that communicates with the terminal device through wireless communication; and a first controller that monitors a state of the vehicle and causes the first communication unit to transmit a notification signal to the terminal device. The notification signal indicates that a first state of the vehicle other than a predetermined state is detected. The terminal device includes a second communication unit that communicates with the vehicle through wireless communication; an output unit that is provided in the ear mounting unit and performs a notification to the user through sound or vibration; and a second controller that causes the output unit to perform the notification to the user based on the notification signal received by the second communication unit when the terminal device moves out of a predetermined distance range in which the vehicle is included.

According to the first aspect of the present disclosure, it is possible to notify solely the user that the state of the vehicle is not the predetermined state through a sound or the like from the output unit mounted on the ear.

In the vehicle state presentation system according to the first aspect of the present disclosure, the second controller of the terminal device may include a determination unit that determines that the terminal device moves out of the predetermined distance range in which the vehicle is included when the second communication unit does not receive communication radio waves from the vehicle or when a strength of the communication radio waves which the second communication unit is equal to or smaller than a predetermined value.

According to the first aspect of the present disclosure, it is possible to detect that the user wearing the terminal device has left the vehicle based on the communication radio waves without providing any other means.

In the vehicle state presentation system according to the first aspect of the present disclosure, the second controller of the terminal device may cause the output unit to perform a notification to the user according to the notification signal when the second controller determines that the state of the vehicle is the first state of the vehicle other than the predetermined state based on the notification signal received by the second communication unit.

According to the first aspect of the present disclosure, when the state of the vehicle is not the predetermined state, it is possible to notify the user of the fact.

In the vehicle state presentation system according to the first aspect of the present disclosure, the terminal device may further include an input unit that receives a first input instructing the vehicle to be in the predetermined state from the user. When the input unit receives the first input from the user who wears the terminal device and is present within a range in which the user communicates with the vehicle after the output unit performs the notification according to the notification signal, the second controller causes the second communication unit to transmit a first instruction signal from to the vehicle, and the first controller of the vehicle may execute an operation of setting the vehicle to the predetermined state when the first communication unit receives the first instruction signal.

According to the first aspect of the present disclosure, even when the user does not return to the vehicle, convenience can be improved since the vehicle can be caused to be in the predetermined state through a remote manipulation.

In the vehicle state presentation system according to the first aspect of the present disclosure, the first controller of the vehicle may execute an operation of setting the vehicle to the predetermined state when the first state other than the predetermined state of the vehicle continues for a predetermined period after the first communication unit transmits the notification signal.

According to the first aspect of the present disclosure, convenience can be improved since the vehicle can be caused to be in the predetermined state without any action of the user.

In the vehicle state presentation system according to the first aspect of the present disclosure, the input unit of the terminal device may further receive a second input instructing the vehicle to maintain a current state from the user. When the input unit receives the second input from the user who wears the terminal device and is present within a range in which the user communicates with the vehicle after the notification according to the notification signal, the second controller may cause the second communication unit to transmit a second instruction signal to the vehicle. The first controller of the vehicle may execute an operation of setting the vehicle to the predetermined state when the first communication unit does not receive the second instruction signal for a predetermined period after the first communication unit transmits the notification signal and the first state of the vehicle other than the predetermined state continues, and may not execute the operation of setting the vehicle to the predetermined state when the first communication unit receives the second instruction signal.

According to the first aspect of the present disclosure, when the user intends to leave the vehicle while maintaining the vehicle in the state other than the predetermined state, the state other than the predetermined state of the vehicle is maintained through a manipulation according to the intention. Thus, it is possible to improve convenience.

A second aspect of the present disclosure relates to a vehicle that performs wireless communication with a terminal device. The vehicle includes a communication unit and a controller. The communication unit communicates with the terminal device through wireless communication. The terminal device includes an ear mounting unit including an output unit having a speaker mounted on an ear of the user and performing a notification to the user. The controller monitors a state of the vehicle and causes the communication unit to transmit a notification signal indicating that a state of the vehicle other than a predetermined state is detected to the terminal device.

According to the second aspect of the present disclosure, it is possible to cause the terminal device that has received the notification signal to notify solely the user that the state of the vehicle is not the predetermined state through a sound or the like from the output unit mounted on the ear.

A third aspect of the present disclosure relates to a terminal device including an ear mounting unit, a communication unit, an output unit, and a controller. The ear mounting unit is mounted on an ear of a user. The communication unit communicates with a vehicle through wireless communication. The output unit is provided in the ear mounting unit and performs a notification to the user through sound or vibration. The controller causes the output unit to execute a notification to the user based on a notification signal indicating a state of the vehicle that the communication unit receives from the vehicle when the terminal device moves out of a predetermined distance range in which the vehicle is included.

According to the third aspect of the present disclosure, it is possible to notify solely the user that the state of the vehicle is not the predetermined state through a sound or the like from the output unit mounted on the ear.

A fourth aspect of the present disclosure relates to a vehicle state presentation method including: monitoring, by a computer of a vehicle, a state of the vehicle and transmitting a notification signal indicating that a state of the vehicle other than a predetermined state is detected to a terminal device through wireless communication, the terminal device including an ear mounting unit including an output unit that is mounted on an ear of the user and performs a notification to the user through sound or vibration; and causing, by the computer of the terminal device, the output unit to perform the notification to the user based on the notification signal received from the vehicle through the wireless communication when the terminal device moves out of a predetermined distance range in which the vehicle is included.

According to the fourth aspect of the present disclosure, it is possible to notify solely the user that the state of the vehicle is not the predetermined state through a sound or the like from the output unit mounted on the ear.

According to the aspects of the present disclosure, it is possible to provide the vehicle state presentation system capable of notification that it is difficult for a third party to notice and it is easy for the user to notice since the notification to the user is performed through a sound or the like from the output unit mounted on the ear when the user leaves the vehicle in a case where the state of the vehicle is not the predetermined state.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Overview

Vehicle state presentation systems according to first to fourth embodiments notify a user leaving a vehicle that a state of the vehicle is not a predetermined state, through a sound or the like from an output unit mounted on an ear of the user. Therefore, it is possible to notify the user that the state of the vehicle is not the predetermined state so that it is easy for the user to notice the fact and it is difficult for a third party to notice the fact.

First Embodiment

Hereinafter, a first embodiment will be described in detail with reference to the drawings.

Configuration

Figure 1:
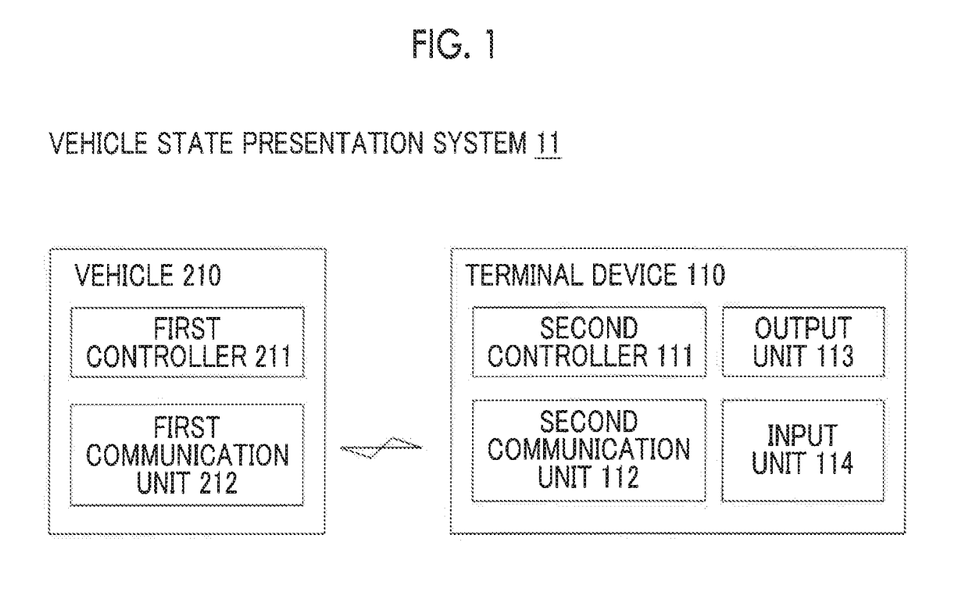
FIG. 1 is a functional block diagram of a vehicle state presentation system according to first to fourth embodiments.

FIG. 1 is a functional block diagram of a vehicle state presentation system 11 according to the present embodiment. The vehicle state presentation system 11 includes a terminal device 110 and a vehicle 210.

The vehicle 210 includes a first controller 211 and a first communication unit 212. The first controller 211 controls the first communication unit 212 to perform wireless communication with the terminal device 110. In a case where a distance between the vehicle 210 and the terminal device 110 is within a range in which the vehicle 210 and the terminal device 110 can perform wireless communication with each other, the first controller 211 executes a communication sequence for authentication with the terminal device 110. For example, the first controller 211 causes the first communication unit 212 to periodically transmit a signal and compares an identifier of the terminal device 110 that the terminal device 110 within the wirelessly communicable distance transmits in response to the signal with an identifier of a regular terminal device associated with the vehicle in advance to authenticate the terminal device 110. Even when the terminal device 110 is within the communicable distance after the authentication, the first controller 211 periodically communicates with the terminal device 110 and detects that the terminal device 110 is present within the distance. The first controller 211 can monitor states of various devices (not illustrated) of the vehicle 210 and notify the terminal device 110 of the state of the vehicle from the first communication unit 212.

The terminal device 110 is a small device including an ear mounting unit that is mounted on an ear of the user. The terminal device 110 includes, for example, a second controller 111, a second communication unit 112, an output unit 113, and an input unit 114. The output unit 113 includes a speaker capable of emitting sound to an external ear canal (hereinafter referred to as an "ear hole") of the user. The input unit 114 includes an authentication microphone that collects an echo sound within the ear hole of the user, and an utterance microphone that collects an uttered sound of the user. The second controller 111, for example, causes the output unit 113 to emit an authentication sound to the ear hole of the user, causes the authentication microphone of the input unit 114 to acquire the echo sound of the authentication sound, and compares characteristics of the echo sound with characteristics of an echo sound of a regular user registered in advance to authenticate the user. The second controller 111 controls the second communication unit 112 to execute the above-described wireless communication with the vehicle 210. The second controller 111 can acquire the state of the vehicle 210 based on a result of the communication. The second controller 111 can generate content of notification to the user as a voice and causes the output unit 113 to output the voice. The second controller 111 may include a determination unit that monitors a state of communication radio waves that the second communication unit 112 receives from the vehicle 210.

Figure 2:
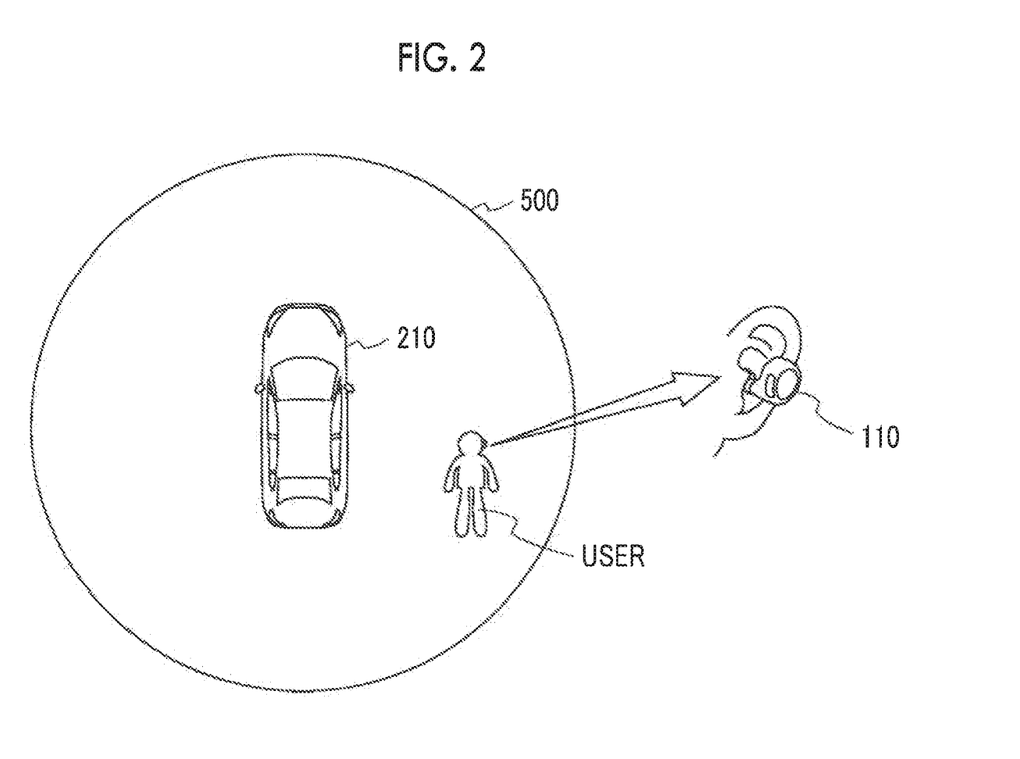
FIG. 2 is a diagram illustrating an example of a communicable range according to the first to fourth embodiments.

As described above, when the terminal device 110 authenticates the user and the vehicle 210 authenticates the terminal device 110, it is desirable to be able to guarantee a combination between the vehicle and the regular user of the vehicle. The authentication method described above is an example and may be modified. For example, the second controller 111 of the terminal device 110 may acquire an identifier of the vehicle 210 through communication, and authenticate the vehicle based on the identifier. FIG. 2 illustrates an example of a range 500 in which the vehicle 210 and the terminal device 110 can wirelessly communicate with each other. The range 500 is, for example, a range of about 10 m or less from the vehicle.

Process

Figure 3:
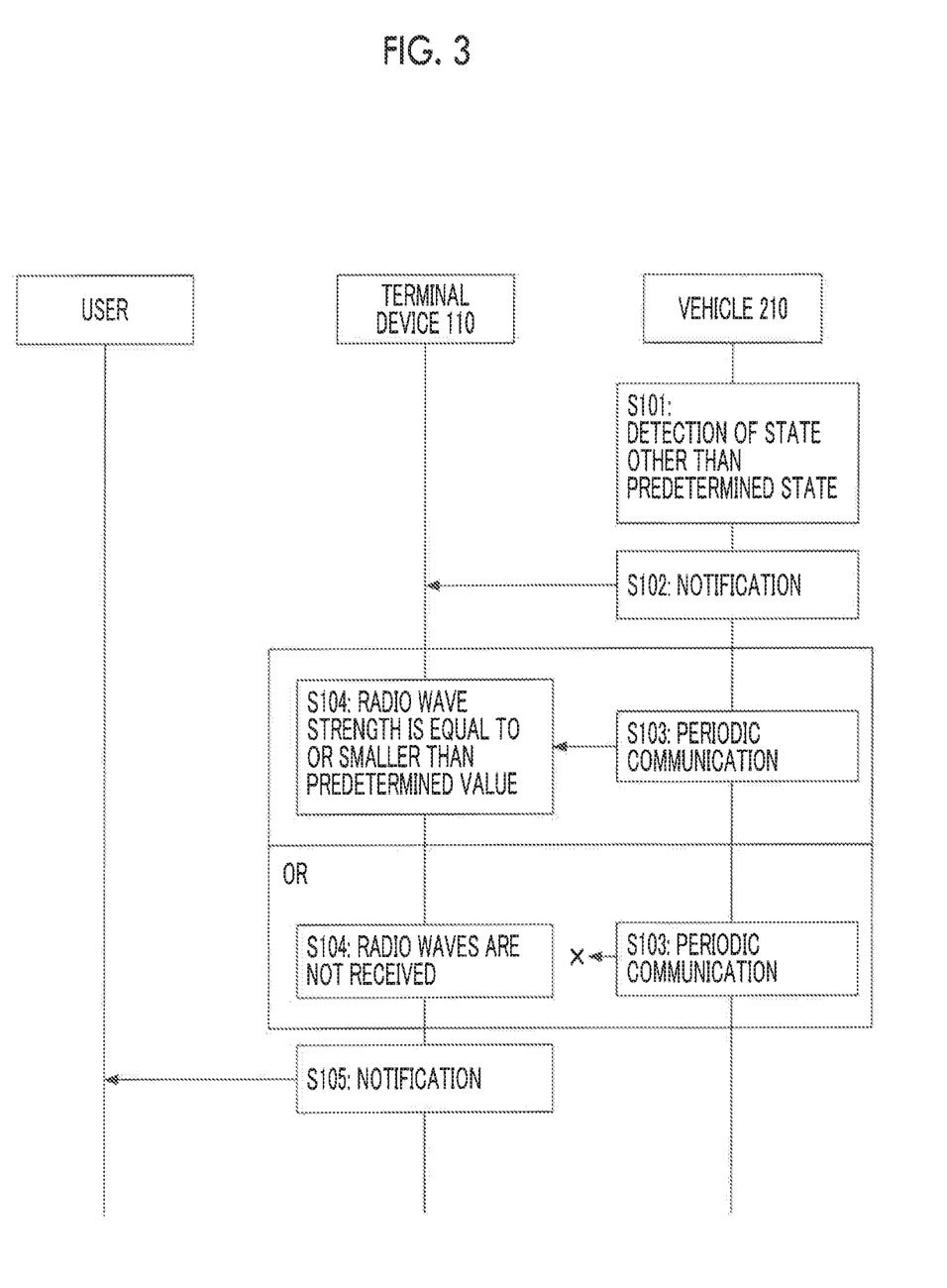
FIG. 3 is a sequence diagram illustrating a process according to the first embodiment.

FIG. 3 is a sequence diagram illustrating a process of the terminal device 110 and the vehicle 210. This process will be described with reference to FIG. 3.

Step S101: The first controller 211 of the vehicle 210 monitors, for example, states of various devices based on information from various controllers mounted on the vehicle. In this step, the first controller 211 detects that the state of the vehicle is not a predetermined state. The predetermined state is a state in which a likelihood of a problem occurring is reduced as compared with other states in terms of security and power consumption even when the user leaves the vehicle and leaves the vehicle. As an example, the predetermined state can be defined as a state in which all lamps are turned off, all of windows are closed, and all of doors are closed and locked in a state in which an engine is stopped and an ignition switch is turned off.

Step S102: When the first controller 211 of the vehicle 210 detects that the state of the vehicle 210 is in a state other than the predetermined state, the first controller 211 causes the first communication unit 212 to transmit a notification signal, which is a signal indicating the above fact. The second communication unit 112 of the terminal device 110 receives the notification signal. The notification signal includes information indicating the state of the vehicle 210, such as a window remaining open. Transmission of the notification signal as described above may be performed as part of the periodic communication described above or may be performed separately from the periodic communication. The notification signal may be periodically transmitted while the state other than the predetermined state of the vehicle is continuing and the transmission may be stopped when the state of the vehicle becomes the predetermined state. Alternatively, the notification signal may be transmitted solely once when a state other than the predetermined state of the vehicle is detected, and the signal indicating the above fact may be transmitted when the state of the vehicle becomes the predetermined state. Alternatively, information indicating the current state may be transmitted regardless of whether or not the state of the vehicle 210 is the predetermined state. By doing as described above, the terminal device 110 can acquire the information indicating the state of the vehicle 210 as long as the terminal device 110 is present within a distance in which the terminal device 110 can communicate with the vehicle 210.

Step S103: The first controller 211 of the vehicle 210 causes the first communication unit 212 to transmit a radio signal as a part of the periodic communication described above.

Step S104: The second controller 111 of the terminal device 110 includes, for example, a determination unit that monitors a state of the communication radio waves from the vehicle 210. When the determination unit detects that the state of the communication radio waves is the predetermined state, the second controller 111 determines that the terminal device 110 has moved outside a predetermined distance range in which the vehicle 210 is included. As a predetermined state of the communication radio waves, for example, the determination unit may detect that a radio wave strength of the communication radio waves becomes equal to or smaller than a predetermined value. Alternatively, the determination unit may detect that communication radio waves cannot be received even after waiting for a certain period of time. By providing the determination unit as described above, it is possible to detect that the user wearing the terminal device 110 leaves the vehicle 210 using communication radio waves without using any other means. However, the determination unit may detect that the user leaves the vehicle 210 using other means.

Step S105: The second controller 111 of the terminal device 110 causes the output unit 113 to execute a notification to the user based on the received notification signal. For example, when the second controller 111 determines that the state of the vehicle 210 is a state other than the predetermined state based on the notification signal, the second controller 111 causes the output unit 113 to perform the notification indicating the fact. The notification can be performed, for example, by emitting a sound "a window is open", which indicates a specific state to the ear hole of the user. Alternatively, the notification is not limited unless it is difficult for a third party to notice, and the output unit 113 may include a vibrator and perform the notification through vibration, for example. The user who has received the notification can return to the vehicle 210 to close the window, and cause the vehicle 210 to enter the predetermined state. Accordingly, this sequence ends.

For example, the terminal device 110 may have a configuration in which all of the units are included in the ear mounting unit that is mounted on the ear of the user, or may have a configuration in which at least the output unit 113 is included in the ear mounting unit, the other units are included in a mobile terminal device such as a smart phone, and the ear mounting unit and the mobile terminal device communicate with each other wirelessly or by a wire. It is desirable for user authentication using the above-described echo sound to be performed, but this is not indispensable. When a determination is made that the terminal device 110 has moved out of the predetermined distance range in which the vehicle 210 is included, it is assumed that the terminal device 110 simply notifies the user that the state of the vehicle is not the predetermined state. Thereafter, when the terminal device 110 determines that the terminal device 110 has returned within the predetermined distance range in which the vehicle 210 is included based on a radio wave strength of the communication radio waves or the like, the terminal device 110 may notify the user of a specific state such as "the window is open". The above-described notification signal may be a signal simply indicating that the state of the vehicle is not the predetermined state, and the signal indicating the specific state may be a signal that the terminal device 110 separately acquires by communicating with the vehicle 210 when a determination is made that the terminal device 110 has returned to be within the predetermined distance range in which the vehicle 210 is included. The user may customize the state of the vehicle 210 to be the predetermined state.

Effects

In the first embodiment, it is possible to notify solely the user that the state of the vehicle is not the predetermined state through a sound or the like from the output unit mounted on the ear. Accordingly, it is possible to perform the notification in such a manner it is easy for the user to notice the notification while achieving improvement of security by making it difficult for the third party to recognize the notification. The notification is performed solely when the user wearing the terminal device leaves the predetermined range including the vehicle. Therefore, when the user is not separated a predetermined distance or more, for example, when the user intentionally temporarily gets off the vehicle in a state other than the predetermined state of the vehicle and intends to ride the vehicle again immediately, the notification is not performed and troubles can be reduced.

Second Embodiment

Hereinafter, a second embodiment will be described in detail with reference to the drawings.

Configuration

Since a vehicle state presentation system according to the second embodiment has the same functional blocks as the vehicle state presentation system 11 according to the first embodiment, the same or corresponding components are denoted with the same reference numerals and description of the same content will be omitted.

Process

In the second embodiment, an instruction can be received from the user to cause the vehicle 210 to execute an operation of setting the predetermined state, after step S105 in the first embodiment.

Figure 4:
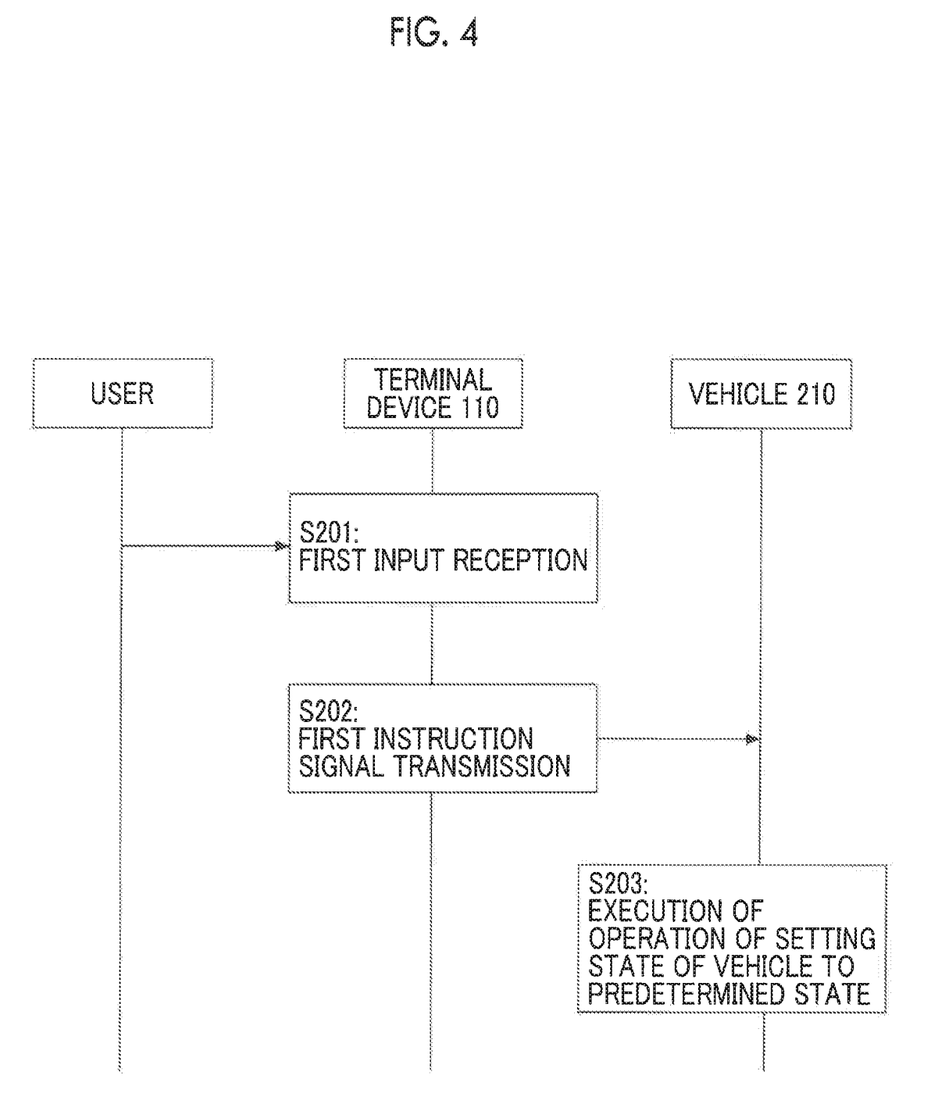
FIG. 4 is a sequence diagram illustrating a process according to the second embodiment.

FIG. 4 is a sequence diagram illustrating a process of the terminal device 110 and the vehicle 210. Since processes of steps S101 to S105 are the same as those in the first embodiment, description will be omitted, and processes after step S105 will be described in FIG. 4.

Step S201: After step S105, the input unit 114 of the terminal device 110 receives a first input which is a predetermined input from the user. The first input can be performed, for example, by uttering predetermined words such as "close the window" to the utterance microphone of the input unit 114. An input method is not limited thereto. For example, when the input unit 114 includes a motion sensor, the input can be performed by a nodding operation in which the user shakes a neck once horizontally.

Step S202: When the second controller 111 of the terminal device 110 analyzes content received by the input unit 114 and determines that the content is the first input, the second controller 111 of the terminal device 110 causes the second communication unit 112 to transmit a first instruction signal according to the content. In a case where a method of determining that the terminal device 110 has moved out of the predetermined distance range in which the vehicle 210 is included when a radio wave strength of communication radio waves becomes equal to or smaller than a predetermined value greater than 0 is adopted in step S104, communication between the terminal device 110 and the vehicle 210 can be performed from a place at a point in time at which the notification is received in step S105, and therefore, the processes of the steps S201 and S202 can be performed even when the user does not move from the place. However, in a case where a method of determining that the terminal device 110 has moved out of the predetermined distance range in which the vehicle 210 is included when the communication radio waves cannot be received even after waiting for a certain period is adopted in step S104, the communication between the terminal device 110 and the vehicle 210 cannot be performed from the place at a point in time at which the notification is received in step S105, and therefore, the user needs to move in a direction in which the user approaches the vehicle from the place. Due to the movement, the terminal device 110 and the vehicle 210 become able to communicate with each other, and the above-described authentication between the terminal device 110 and the vehicle 210 is executed again. The user moves in a direction in which the user approaches the vehicle at the time of the input in step S201, such that the process of S202 can be suitably executed. Therefore, it is desirable to notify the user of the fact that the user is needed to approach the vehicle when the first input is performed, in advance or at the time of the notification in step S105.

Step S203: The first communication unit 212 of the vehicle 210 receives the first instruction signal. According to the first instruction signal, the first controller 211 of the vehicle 210 executes the operation of each unit, such as closing of the window, so that the state of the vehicle 210 becomes the predetermined state. Then, this sequence ends.

Effects

In the second embodiment, when the notification indicating that the state of the vehicle is not the predetermined state is received, the user performs the predetermined first input to the terminal device. Thus, it is possible to remotely instruct the vehicle to execute the operation of setting the predetermined state. Therefore, the user does not need to return to the vehicle in order to cause the vehicle to return to the predetermined state, and convenience can be improved.

Third Embodiment

Hereinafter, a third embodiment will be described in detail with reference to the drawings.

Configuration

Since the vehicle state presentation system according to the third embodiment has the same functional blocks as the vehicle state presentation system 11 according to the first embodiment, the same or corresponding components are denoted with the same reference numerals and description of the same content will be omitted.

Process

In the third embodiment, when the state other than the predetermined state of the vehicle continues for a predetermined period after step S105 in the first embodiment, it is possible to cause the vehicle 210 to execute an operation of setting the predetermined state.

Figure 5:
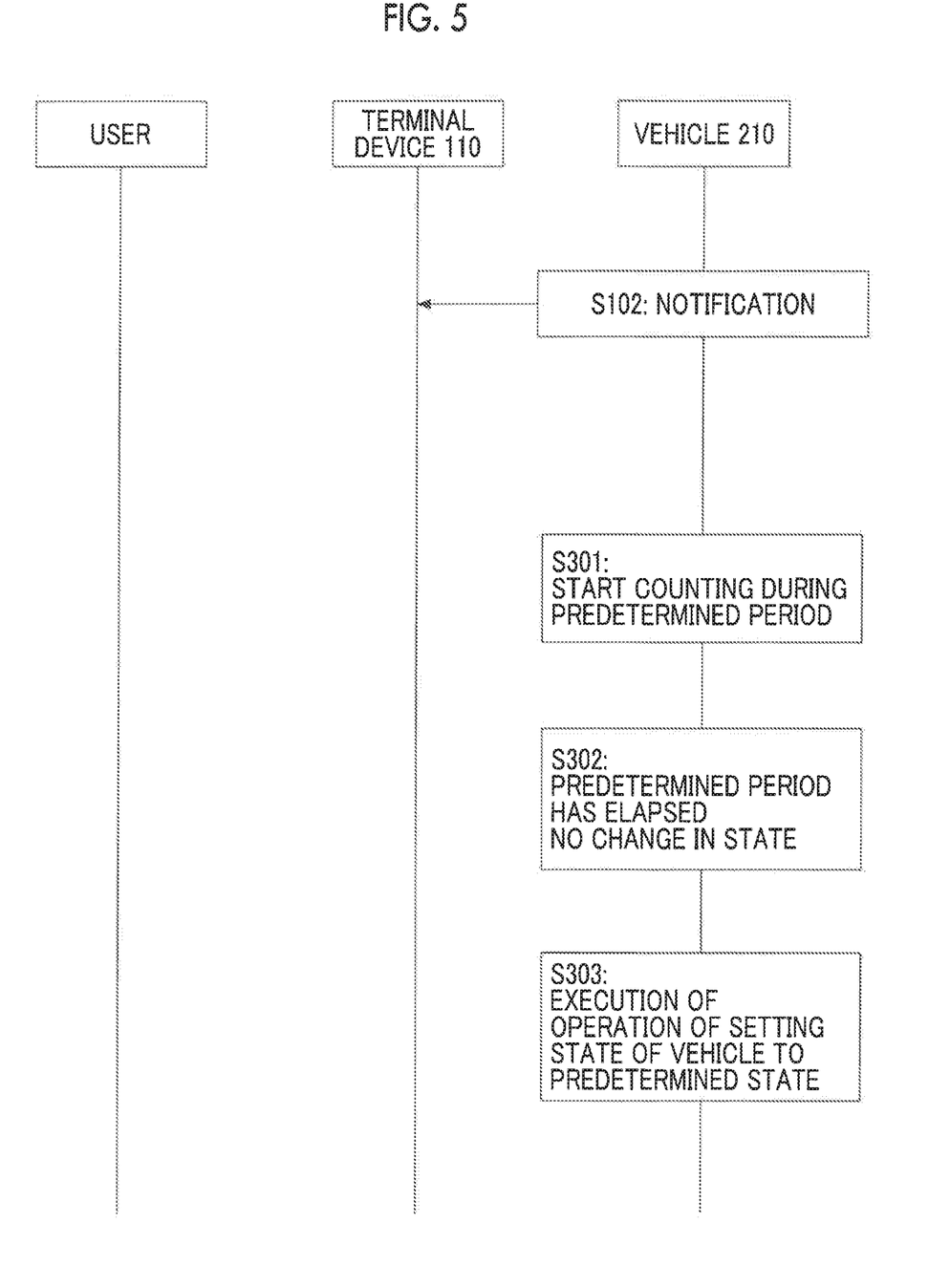
FIG. 5 is a sequence diagram illustrating a process according to the third embodiment of the present disclosure.

FIG. 5 is a sequence diagram illustrating a process of the vehicle 210. Since the processes of steps S101 to S105 are the same as those in the first embodiment, description thereof will be omitted, and FIG. 5 illustrates a process that the vehicle 210 executes in parallel with the sequence illustrated in FIG. 3 in step S102 and subsequent steps.

Step S301: After step S102, the first controller 211 of the vehicle 210 resets a timer and then starts counting of the timer.

Step S302: The first controller 211 of the vehicle 210 detects that a predetermined period has elapsed when a count value reaches a predetermined value. In this step, the first controller 211 does not detect a change in the state of the vehicle for the predetermined period and regards the state other than the predetermined state of the vehicle as continuing.

Step S303: The first controller 211 of the vehicle 210 executes the operation of each unit, such as closing of the window, so that the state of the vehicle 210 becomes the predetermined state. Then, this sequence ends. In step S302, when the state of the vehicle changes for the predetermined period to be the predetermined state, the user is regarded as manipulating the vehicle to set the predetermined state and this step S303 is not executed. In step S302, when the state of the vehicle changes for the predetermined period and changes to a state other than the predetermined state, the user is regarded as manipulating the vehicle to intentionally set the state other than the predetermined state, and this step S303 may not be executed or may be executed for a more suitable predetermined state.

The second embodiment may be incorporated in the third embodiment. That is, the vehicle 210 may execute an operation of immediately setting the predetermined state when an instruction input is received from the user for the predetermined period, and execute the operation of setting the predetermined state after a predetermined period has elapsed when the instruction input is not received from the user for the predetermined period. The vehicle 210 may be caused to receive a signal indicating that the terminal device 110 has performed the notification to the user in step S105 and the counting may be started when the signal is received, instead of starting the counting process of step S301 after step S102. Alternatively, in the periodic communication in step S103, the counting may be started when the vehicle 210 detects that the radio wave strength of the communication radio waves is reduced or the communication radio waves cannot be received. In any case, the count value may be set so that a predetermined period elapses after the notification in step S105.

Effects

In the third embodiment, when the user leaves the vehicle for a predetermined period without manipulating the vehicle after receiving the notification indicating that the state of the vehicle is not the predetermined state, the user can execute the operation of automatically setting the predetermined state. Therefore, the user does not need to perform any action to set the vehicle to the predetermined state. Thus, it is possible to improve convenience.

Fourth Embodiment

Hereinafter, a fourth embodiment will be described in detail with reference to the drawings.

Configuration

Since a vehicle state presentation system according to the fourth embodiment has the same functional blocks as the vehicle state presentation system 11 according to the first embodiment, the same or corresponding components are denoted with the same reference numerals and description of the same content will be omitted.

Process

In the fourth embodiment, an instruction from the user can be received within a predetermined period and the vehicle can be caused to be in a state other than the predetermined state after step S301 in the third embodiment.

Figure 6:
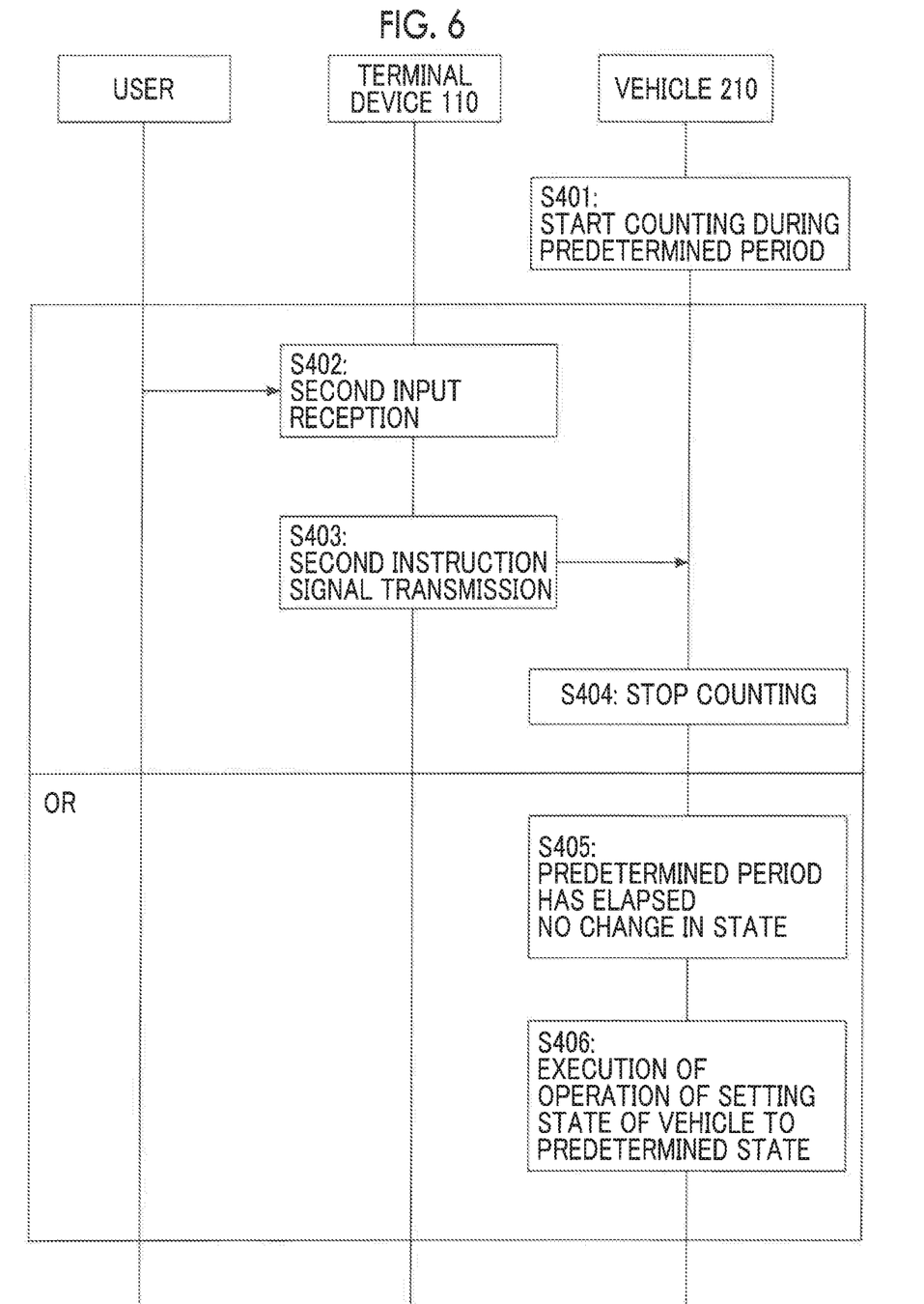
FIG. 6 is a sequence diagram illustrating a process according to the fourth embodiment of the present disclosure.

FIG. 6 is a sequence diagram illustrating a process of the terminal device 110 and the vehicle 210. Since processes of steps S101 to S105 are the same as those in the first embodiment, description and illustration in FIG. 6 thereof will be omitted.

Step S401: The first controller 211 of the vehicle 210 starts the counting of the timer after step S102, similar to step S301 of the third embodiment.

Step S402: In this step, it is assumed that the input unit 114 of the terminal device 110 receives a second input as a predetermined input from the user before the predetermined period elapses. The second input can be performed, for example, by uttering predetermined words such as "leave it as is" to the utterance microphone of the input unit 114. An input method is not limited thereto. For example, when the input unit 114 includes a motion sensor, the input can be performed by a nodding operation in which the user shakes a neck once horizontally. In a case where a method of determining that the terminal device 110 has moved out of the predetermined distance range in which the vehicle 210 is included when the communication radio waves cannot be received even after waiting for a certain period is adopted in step S104 as in the second embodiment, the user moves in a direction in which the user approaches the vehicle before the user performs the second input.

Step S403: When the second controller 111 of the terminal device 110 analyzes content received by the input unit 114 and determines that the content is the second input, the second controller 111 of the terminal device 110 causes the second communication unit 112 to transmit a second instruction signal according to the content.

Step S404: The first communication unit 212 of the vehicle 210 receives the second instruction signal. The first controller 211 of the vehicle 210 stops the counting of the timer according to the second instruction signal. When the second instruction signal is received as described above, the first controller 211 does not execute the operation of setting the vehicle 210 to the predetermined state, and this sequence ends.

Step S405: In this step, it is assumed that, for the predetermined period, the first communication unit 212 does not receive the second instruction signal, the first controller 211 does not detect a change in the state of the vehicle, and the state other than the predetermined state of the vehicle continues. In this case, the first controller 211 of the vehicle 210 detects that a predetermined period has elapsed since the count value is a predetermined value, as in step S302 in the third embodiment.

Step S406: The first controller 211 of the vehicle 210 executes the operation of each unit such as closing of the window so that the state of the vehicle 210 becomes the predetermined state, as in step S303 in the third embodiment. Accordingly, this sequence is ended.

The second embodiment may be incorporated in the fourth embodiment. That is, the first controller 211 of the vehicle 210 may immediately execute the operation of setting the vehicle to the predetermined state when an instruction input from the user is received for the predetermined period. In step S404, the sequence is not ended, the same processes as those in steps S405 and S406 are performed, and the first controller 211 of the vehicle 210 may execute the operation of setting the vehicle to the predetermined state after a predetermined time longer than the above-described predetermined time has elapsed.

Effects

In the fourth embodiment, when the user leaves the vehicle for a predetermined period without manipulating the vehicle after receiving the notification indicating that the state of the vehicle is not the predetermined state, the vehicle automatically enters the predetermined state. However, when the user performs a predetermined second input within a predetermined period, the vehicle can be prevented from automatically entering the predetermined state. Therefore, when the user intends to leave the vehicle while maintaining the vehicle in the state other than the predetermined state, the state other than the predetermined state of the vehicle is maintained according to the intention. Thus, it is possible to improve convenience.

According each of the embodiments described above, it is possible to provide the vehicle state presentation system capable of notifying the user leaving the vehicle that the state of the vehicle is not the predetermined state, in such a manner that solely the user easily notices the fact. Accordingly, for example, when the user leaves the vehicle in a state unsuitable for security or power consumption, it is possible to notify the user of the fact without being known to a third party and to request an appropriate action.

The present disclosure can be recognized not only as the vehicle state presentation system, but also as a terminal device and a vehicle constituting the vehicle state presentation system, a vehicle state presentation method to be executed by a processor of a computer included in the terminal device and the vehicle, and a program therefor.

The present disclosure is useful for a system that notifies a user of a state of a vehicle or the like.

What is claimed is:

1. An information processing device comprising:
an acquisition unit that acquires information indicating a state of a vehicle from the vehicle; and
a notification unit that performs a first notification regarding the state when the information processing device is outside a predetermined range including the vehicle, and that performs a second notification including an information on the state different from the first notification when the information processing device is in the predetermined range, wherein
the first notification indicates that the vehicle is not in a predetermined state, and the second notification identifies a specific reason why the vehicle is not in the predetermined state.

2. The information processing device according to claim 1, wherein
the notification unit includes a speaker so that the first notification is performed by emitting sound, and the second notification is performed by emitting sound different from the sound of the first notification.

3. The information processing device according to claim 1, wherein
the acquisition unit acquires first information corresponding to the first notification from the vehicle when the information processing device is outside the predetermined range, and acquires second information corresponding to the second notification from the vehicle when the information processing device is in the predetermined range.

4. The information processing device according to claim 1, wherein
the second notification indicates that a window of the vehicle is open.

5. The information processing device according to claim 1, further comprising:
a determination unit that determines whether the information processing device is outside or in the predetermined range.

6. The information processing device according to claim 5, wherein
the determination unit determines whether the information processing device is outside or in the predetermined range, based on states of communication radio waves of the information processing device and the vehicle.

7. A method that is carried out by a processor of a computer, the method comprising:
acquiring information indicating a state of a vehicle from the vehicle;
performing a first notification regarding the state, when an information processing device is outside a predetermined range including the vehicle; and
performing a second notification including an information on the state different from the first notification, when the information processing device is in the predetermined range, wherein
the first notification indicates that the vehicle is not in a predetermined state, and the second notification identifies a specific reason why the vehicle is not in the predetermined state.

8. A vehicle state presentation system comprising:
a vehicle; and
the information processing device of claim 1.

9. The vehicle state presentation system according to claim 8, wherein
the notification unit includes a speaker so that the first notification is performed by emitting sound, and the second notification is performed by emitting sound different from the sound of the first notification.

10. The vehicle state presentation system according to claim 8, wherein
the acquisition unit acquires first information corresponding to the first notification from the vehicle when the information processing device is outside the predetermined range, and acquires second information corresponding to the second notification from the vehicle when the information processing device is in the predetermined range.

11. The information processing device according to claim 2, wherein the second notification includes a second word utterance that is different from a first word utterance included in the first notification.

12. The information processing device according to claim 1, wherein the state indicates a potentially undesirable condition in which the vehicle was left when a user of the vehicle left the vehicle.

13. The vehicle state presentation system according to claim 9, wherein the second notification includes a second word utterance that is different from a first word utterance included in the first notification.

14. The vehicle state presentation system according to claim 8, wherein the state indicates a potentially undesirable condition in which the vehicle was left when a user of the vehicle left the vehicle.

15. The method according to claim 7, wherein the state indicates a potentially undesirable condition in which the vehicle was left when a user of the vehicle left the vehicle.

16. The method according to claim 7, wherein the first notification is performed by emitting sound, and the second notification is performed by emitting sound different from the sound of the first notification.

17. The method according to claim 16, wherein the second notification includes a second word utterance that is different from a first word utterance included in the first notification.

\* \* \* \* \*